United States Patent [19]
Walden

[11] 3,710,098
[45] Jan. 9, 1973

[54] NAVIGATION LIGHTS
[75] Inventor: Noel Harry Fred Walden, Queensland, Australia
[73] Assignee: Laser Electronics Pty. Ltd., Queensland, Australia
[22] Filed: May 24, 1971
[21] Appl. No.: 146,222

[52] U.S. Cl. ..................240/49, 240/24, 240/61.05, 340/25, 340/50, 340/331
[51] Int. Cl. ..............................................F21g 3/02
[58] Field of Search..........240/22, 49, 24, 41, 61.05; 340/25, 331, 50

[56] References Cited

UNITED STATES PATENTS

| 2,748,371 | 5/1956 | Wilcox | 340/25 |
| 3,542,452 | 11/1970 | Gerritsen | 350/160 R X |
| 3,363,092 | 1/1968 | Harling | 240/25 |
| 3,205,478 | 9/1965 | Scheg | 340/50 X |
| 2,096,755 | 10/1937 | Parsberg | 340/25 |
| 3,266,014 | 8/1966 | Leotta | 240/49 X |
| 3,139,604 | 6/1964 | Meiners | 340/25 |

OTHER PUBLICATIONS

Journal of the Optical Society of America, Vol. 28, Aug., 1938, pages 280-285.

Primary Examiner—Samuel S. Matthews
Assistant Examiner—Monroe H. Hayes
Attorney—Oberlin, Maky, Donnelly & Renner

[57] ABSTRACT

A swept-beam visual light assembly includes a laser light source, a beam collimator, and beam-sweeping means in which the beam width and rate of sweep are such as to give a light flash of duration more than 100 microseconds and beam power at maximum range not less than $4 \times 10^{-9}$ watts per square centimeter. The laser is preferably stationary and the collimator and beam-sweeping means rotate together.

4 Claims, 1 Drawing Figure

PATENTED JAN 9 1973 3,710,098
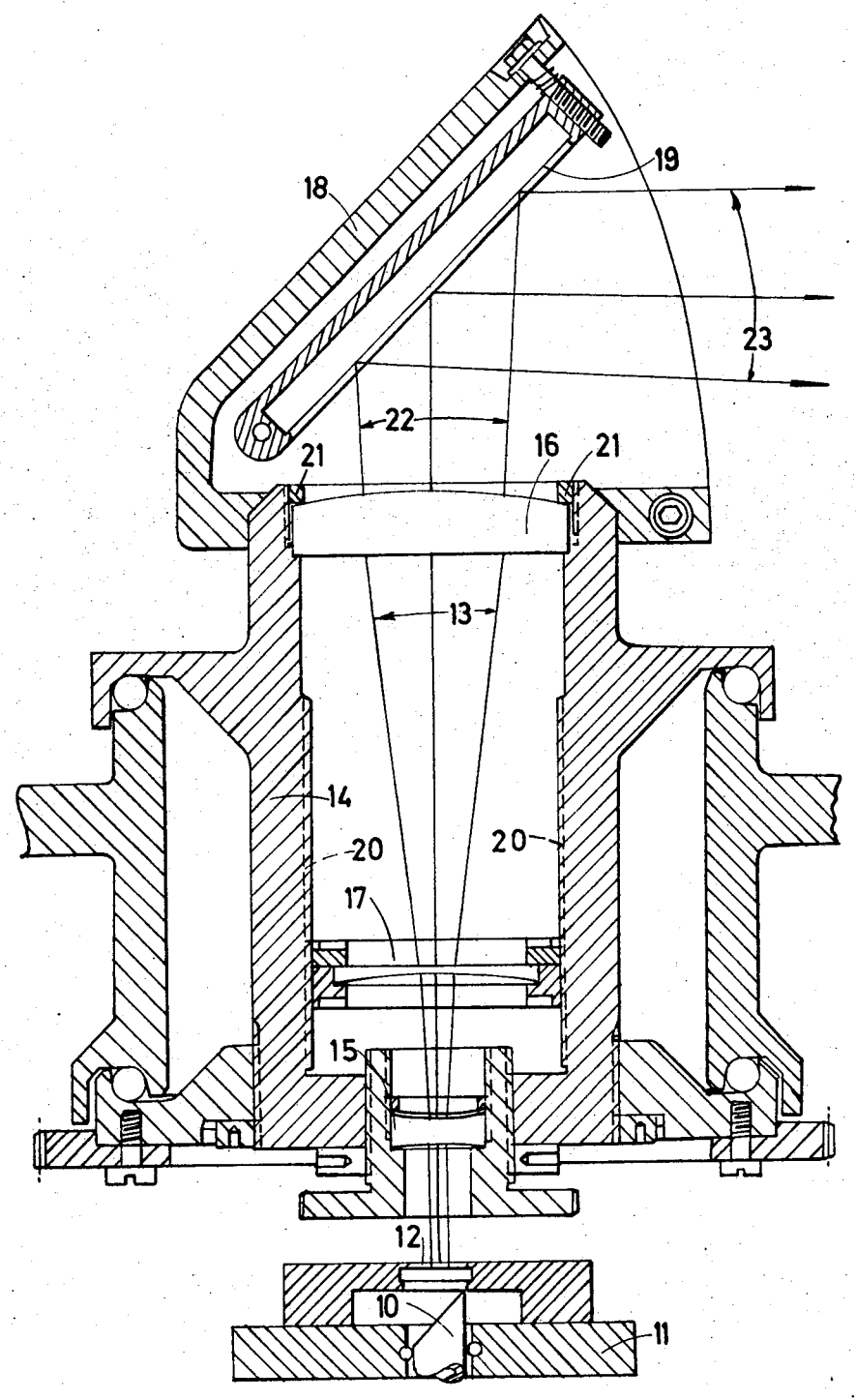

NAVIGATION LIGHTS

This invention relates to swept-beam light sources, particularly for use as navigation lights, such as in lighthouses and on lightships.

Existing sources use powerful and bulky lights, reflectors and beam-sweeping mechanisms and consequently need substantial buildings and large power-supplies.

The light used, even with the best focussing and concentration available, is quickly attenuated by smoke, haze, rain or mist.

The light from a laser on the other hand is monochromatic and coherent and has the following recognized characteristics:

a. It can be focussed easily to an extremely narrow beam;

b. Consequently the light power can be very greatly concentrated in this beam, even from sources using low power;

c. Atmospheric attenuation is less than with incoherent light;

d. Its monochromatic nature makes it readily recognizable and distinguishable from background light.

Laser light would appear to be well-suited to use in swept-beam navigational lights for increased range, portability, ease and cost of erection, cost of operation, and recognition. However, to obtain sufficient power-concentration in a laser beam for these advantages to be effective, the beam must be extremely narrow. The time that such a rotating beam is visible at a distance is therefore very short, unless the rate of rotation is slowed below practical limits.

This appears to rule out an ordinary rotating laser beam as a light-source for visual reception. Consequently lasers have not in fact been used or proposed for this purpose.

This invention is based on the discovery that, with coherent light above a certain level of intensity, the apparent visual intensity for short flashes is independent of the time the flash lasts.

Therefore a beam of laser light rotating past an observer gives the impression of a bright flash even if the eye registers the light for less than a very short time, which for a standard lighthouse beam would be invisible. This maximum time is some 100 microseconds.

The minimum level of intensity to achieve this effect is approximately $4 \times 10^{-9}$ watts per square centimeter or 6,000 microeux and is easily attained by concentration of the laser beam, even at horizon distances.

The invention has as its primary object to provide a rotating visual navigation light using a laser beam.

Another object of the invention is to provide such a light which is cheap and simple to erect and maintain, requires only a small power supply, gives increased range particularly in adverse atmospheric conditions and which is easily recognized.

In order that the invention may be better understood, a particular embodiment will be described, by way of example, with reference to the single FIGURE of the accompanying drawing, which shows in vertical section a lighthouse head according to this invention.

A 50-milliwatt Helium/Neon laser 10 is mounted on a fixed base 11 to emit light vertically through an aperture 12. The light beam 13 passes through a collimator carried by a rotor 14.

The collimator includes a beam-expanding divergent lens 15, a collimating lens 16 and an interposed cylindrical fan lens 17.

A frame 18 is fixed to the upper part of rotor 14 and carries a plane reflecting mirror 19 set at the angle needed to transmit the beam in the desired direction, usually at 45° for horizontal transmission, but not necessarily so.

The fan lens 17 gives a beam 13 of elliptical cross-section. Lens 17 is vertically adjustable in guides 20 to vary the ellipticity. Collimator lens 16 converts diverging beam 13 to a near-parallel beam 22 which, by reflection at mirror 19, becomes transmitted beam 23. Collimator lens 16 is vertically adjustable in guides 21.

Transmitted beam 23 is of elliptical section with its major axis vertical at all positions of rotor 14. The ellipticity of the beam and its divergence (and hence its azimuthal width) may be adjusted by adjustments of fan lens 17 and collimator lens 16.

The rotor 14 is driven by any suitable means, such as an electric motor (not shown).

If the transmitted beam 23 is required in a limited arc only, a blanking screen (not shown) may be fitted to mask the unwanted arc. The rotor 14 may be driven more quickly through the unwanted arc, depending on the required period between flashes.

Typical parameters for operation of a system as described may be as follows:

Laser output: 0.050 watts at 6,328 Angstroms
Period of rotation: 10 seconds
Horizontal divergence of beam: 0.000143 radians
Vertical divergence of beam: 0.0075 radians
Ellipticity of beam (Approximately): 1/52
Width of beam at 50Km: 3 meters
Height of beam at 50Km: 156 meters
Approximate intensity at 50Km: $12 \times 10^{-9}$ watts/sq.cm.
Duration of flash: approximately 90 microseconds
Equivalent intensity: 12,200,000 candelas.

The advantages of the invention will be apparent from the example described.

The laser source 10 is very small, light and easily replaced at low cost. The power needed by it is neglibible.

The collimator assembly and mirror 19 are also relatively simple and light and form a single unit with rotor 14. The adjustments of lenses 16 and 17 allow variation of beam width and shape with a standard assembly. The motor for rotating the assembly need only be of low power.

It is therefore clear that the arrangement described does not need either massive construction nor large power supplies.

What I claim is:

1. A swept-beam visual light assembly comprising:

a. a housing having a vertical aperture extending therethrough, b. means for rotating said housing about the axis of said aperture, c. a fixed laser light source mounted exteriorly of said housing and projecting a light beam axially through said aperture, d. an oblique planer mirror mounted on said housing for rotation therewith above said aperture, e. a beam-expanding divergent lens, a cylindrical fan lens and a collimating lens all mounted on said housing within said aperture and rotatable with said housing, and
f. means for adjusting said fan lens and said collimating lens axially of said aperture.

2. The assembly of claim 1, further including means for adjusting the inclination of said mirror.

3. The assembly of claim 1, in which said beam is of elliptical cross section, with major axis vertical.

4. The assembly of claim 1, in which said fan lens is interposed coaxially between said beam-expanding lens and said collimator lens.

* * * * *